March 19, 1968     J. P. WEBER, JR     3,374,420
POWER CONTROL DEVICE HAVING AN OVERLOAD CURRENT CIRCUIT
Filed Oct. 6, 1964
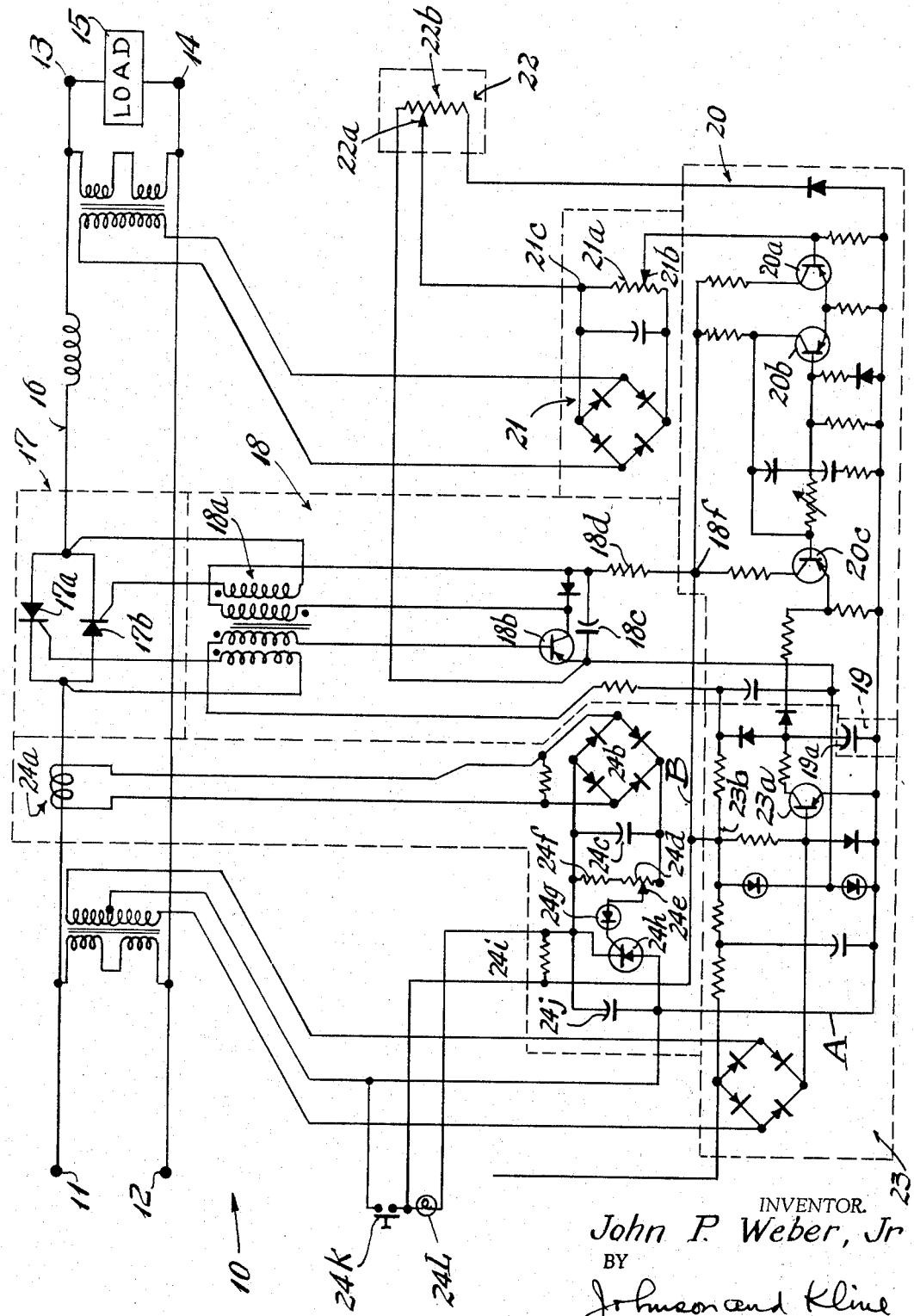
INVENTOR.
John P. Weber, Jr
BY
Johnson and Kline
ATTORNEYS

United States Patent Office 3,374,420
Patented Mar. 19, 1968

3,374,420
POWER CONTROL DEVICE HAVING AN OVERLOAD CURRENT CIRCUIT
John P. Weber, Jr., West Hartford, Conn., assignor to The Superior Electric Company, Bristol, Conn., a corporation of Connecticut
Filed Oct. 6, 1964, Ser. No. 401,841
8 Claims. (Cl. 323—9)

ABSTRACT OF THE DISCLOSURE

A power control unit for regulating power to a load by adjusting the conduction of SCR's including a circuit for sensing the occurrence of a relatively sustained overload value of current and preventing the application of triggering pulses to the SCR's until the circuit is reset.

The present invention relates to a circuit that is incorporated in a power control device, such as a voltage regulator, to protect the components of the device from damage and more particularly to such a circuit which prevents passage of any current after a relatively sustained passage of current having a value greater than that desired through the device.

In United States patent application Ser. No. 149,747, filed Nov. 2, 1961 by Allen R. Perrins, now Patent No. 3,243,689, and assigned to the assignee of the present invention, there is disclosed a power control device that includes a plurality of semiconductor elements that are used to regulate the power between an A.C. source and the output terminals of the device. The said power control device further discloses, in addition to a momentarily functioning current limiting device, an overload current safety current. The safety circuit is employed to limit conduction of current through the power control device to a value that is not capable of being destructive to the semiconductor elements. While such a circuit has been found satisfactory in the embodiment of the invention disclosed in the above-noted application, it has been found that in many instances it is desirable to prevent the passage of any current at all if the current should rise somewhat above the desired value for a sustained period, such as five or ten cycles of the A.C. frequency. Such an instance would include a partial short circuit in the load. Moreover, in the above-described application, the overload current safety circuit is automatically resettable in the sense that it always allows the predetermined maximum value of current to pass irrespective of previous current flow conditions, and thus fails to provide an indication of possible fault conditions. The circuit of the present invention, however, upon becoming operative provides an indication that it has become operative to so inform the operator.

It is accordingly an object of the present invention to provide an overload circuit for a voltage controlling device that is capable of assuredly preventing damage to the device upon the passage of a sustained current greater than that desired.

Another object of the present invention is to provide a circuit that achieves the above object but which is self-maintaining upon actuation to continue the prevention of current flow through the device and which requires manual or power interruption to be reset.

A further object of the present invention is to provide a circuit which achieves the above object but yet which is relatively economical to manufacture, which is exceedingly reliable in use, and which may be adjusted with substantial accuracy to the value of current desired to cause its actuation.

In carrying out the present invention the power control circuit is similar to that disclosed in the above-noted application of Allen R. Perrins and accordingly connected between the input terminals and output terminals are semiconductor elements. Specifically the elements are disclosed as silicon controlled rectifiers though other gate triggered elements may be employed, and the amount of power controlled depends on the duration for each one-half cycle of alternating current at the input that an SCR is rendered conducting. The power control circuit further includes an oscillating firing circuit for providing the signal to cause conduction of the SCR's with said firing circuit being rendered oscillating upon a condenser achieving a selected value of potential difference thereacross. The potential on the condenser is substantially zero for the beginning of each one-half cycle and there is initially placed thereacross a precharge voltage having a value that is determined by a settable circuit and a feedback circuit together with a charging circuit that applies a voltage across the condenser with this voltage being increased at a selected rate during the one-half cycle. Upon the sum of the precharge voltage plus the charging voltage across the condenser being that required to render the firing circuit oscillating, the SCR's are then caused to become conductive and transmit power between the input and output terminals for that half cycle.

In the present invention, the overload current circuit senses the current passing through the device and applies the current to another condenser with this condenser, upon a sustained overload having a potential difference which is sufficient to cause another semiconductor element to become conductive. This semiconductor element is interconnected with the power supply circuit to the condenser, the oscillating circuit, the precharge circuit and the charging circuit and upon operation substantially reduces the supply voltage to these circuits and the voltage across the condenser thereby rendering them incapable of operating. A decrease in the supply voltage to any one of the three above circuits and the condenser is sufficient in itself to prevent conduction of the SCR's and thus the present invention assuredly prevents the application of a gating signal to the SCR's upon functioning of the overload circuit. Moreover, the overload safety circuit by reason of its construction is maintained energized until operation of a manual reset or by an interruption of power at the input terminals.

Other features and advantages will hereinafter appear.

In the drawing:

The sole figure is a schematic view of a power control device having the overload current safety circuit of the present invention incorporated therein.

Referring to the drawing, the power control circuit is generally indicated by the reference numeral 10 and includes a pair of input terminals 11 and 12 and a pair of output terminals 13 and 14 across which a load 15 is connected. As will be hereinafter appreciated while the load may consist of any current consuming device, the present invention has particular utility when the load consists of incandescent lamps which have an initially low resistance and thus permit passage of a somewhat sustained initial overload current.

Connected in the lead 16 between the terminals 11 and 13 is a semiconductor power circuit 17 having a pair of parallelly connected oppositely poled SCR's 17a and 17b. The gates of the elements 17a and 17b are connected to a transformer 18a of an oscillating firing circuit 18 having the components indicated interconnected in the manner shown. The oscillating firing circuit 18 additionally includes a transistor 18b that is normally nonconductive in its emitter-collector path until a condenser 19 has a preselected voltage thereacross at which time the transistor becomes conductive at a frequency determined by the condenser 18c and resistor 18d.

A precharge circuit 20 is connected to the negative side 19a of the condenser 19 to regulate the negative value of voltage thereat by controlling the conduction to the emitter-collector of a pair of transistors 20a and 20b connected as a differential amplifier balanced for temperature and another transistor 20c connected as an emitter-follower. It will be understood that the more the transistor 20c conducts, the higher will be the precharge voltage on the negative side of the condenser 19 and hence the voltage thereacross.

The precharge circuit is interconnected to a feedback circuit 21 and a settable circuit 22. The feedback circuit includes an adjustable potentiometer 21a which has a tap 21b that is connected to the base of transistor 20a to apply a value of voltage related to the voltage between the output terminals 13 and 14 while the settable circuit at the negative end 21c of the potentiometer 21a applies a relatively positive voltage as determined by the setting of the tap 22a of an adjustable potentiometer 22b. Thus by controlling the positive voltage applied to the end 21c, the voltage at the base of transistor 20a may thus be set to provide the desired conduction of transistor 20a to effect the value of the precharge voltage on the condenser 19 which will provide the desired power output.

The charging circuit 23 applies across the condenser 19 a voltage which during each one-half cycle has a rate of increase which without a precharge voltage would be insufficient to cause sufficient voltage across the condenser to effect oscillation of the circuit 18. The rate is substantially linear and thus by presetting the value of precharge voltage the specific time in the one-half cycle when the circuit 18 is rendered oscillating can thus be accordingly accurately set. The charging circuit includes the components shown and in addition at the end of each one-half cycle completely discharges the condenser 19 by a transistor 23a being rendered conducting for a short interval.

The charging circuit 23, the precharge circuit 20, the oscillating circuit 18, the feedback circuit 21 and the power circuit 17 are sufficiently identical to the circuits described in the above-mentioned patent application to which reference is hereby made for a fuller description. In addition, the settable circuit though somewhat different functions in the same manner as the settable circuit in the previously mentioned application in that it is utilized to control, in conjunction with the feedback circuit, the conduction of the transistor 20a. The settable circuit enables an operator to set the desired power delivered to the load 15.

In carrying out the present invention, it has been found that the semiconductor elements 17a and 17b are subject to malfunctioning should sustained overload currents be passed therethrough. Such a sustained overload may be on the order of 115% rated current for a duration of perhaps five to ten cycles of the alternating current applied at the input terminals 11 and 12 or may consist of a much larger percentage of rated current for a shorter duration, each of which would tend to be harmful to the components of the device. Accordingly, to obviate such an occurrence an overload safety current circuit 24 is provided which functions to prevent passage of current through the power circuit 17 by preventing the presence of a signal at the gates thereof. This circuit includes a current transformer 24a inductively connected to the lead 16, a full wave bridge rectifier 24b, a condenser 24c connected across the D.C. terminals of the rectifying bridge 24b and a potential divider including a variable potentiometer 24d having a tap 24e and a fixed resistor 24f. The tap 24e is connected to a breakdown diode 24g that is also connected to the gate of an SCR 24h. The anode of the SCR 24h is connected to a lead A while the cathode is connected through a current limiting resistance 24i to a lead B. The lead B has a connection to the negative lead 23b of the charging circuit and hence to the negative side of the condenser 19, a connection 18f to the collector of the transistor 18b and connections to the collectors of the transistors 20a, 20b and 20c. Moreover, the lead A is connected to the emitters of the transistors 23a, 20c, 20b and 20a and also to the positive side of the condenser 19. The lead A constitutes the positive side of the direct current supply voltage for operating the circuits 18, 20 and 23 and also the supply for the positive voltage to the condenser 19 while the lead B constitutes the negative side of the direct current supply voltage.

With this structure it will be appreciated that the SCR 24h is normally nonconducting during normal operation of the device and a potential difference exists between the leads A and B thus enabling the charging, precharge and oscillating firing circuits and condenser to function in their prescribed normal manner. In addition, the current transformer 24a creates a voltage across the condenser 24c which by reason of the setting of the tap 24e is insufficient to cause conduction reversely through the breakdown diode 24g. However, whenever the current induced in the current transformer 24a is sufficient to charge the condenser 24c to a potential which through the tap 24e is greater than the breakdown voltage of the diode 24g, then current will flow through the diode to the gate of the SCR 24h to render it conducting. Upon this occurring the leads A and B are substantially short-circuited by the SCR 24h and resistor 24c and the potential difference between these two leads is made insufficient to render (1) oscillating circuit transistor 18b conducting, (2) the transistors 20a, 20b and 20c nonconducting, (3) the transistor 23a conducting and (4) the charging of the condenser 19 to a value sufficient to cause oscillation of the firing circuit. Thus neither one of the three circuits nor the condenser is thus capable of functioning to provide a gate signal to the power SCR's 17a and 17b.

It will be appreciated that the current flowing through the SCR 24h is a direct current and thus once it is rendered conducting, it inherently maintains itself conducting. A condenser 24j aids in maintaining the current flow through the SCR 24h above the value which would inherently render it nonconducting. Accordingly, so long as power is maintained at the input terminals 11 and 12, the SCR's 17a and 17b are maintained in a nonconducting state once the SCR 24h is rendered conducting.

The present invention provides for an operator to be able to manually reset the overload current safety circuit 24 upon it becoming activated. This is achieved by a momentarily actuated switch 24k connected on one side to the anode of the SCR 24h and on the other side through the resistor 24i to the cathode thereof. Thus upon the momentary closure of the contacts of switch 24k, the SCR 24h is in effect substantially short-circuited which reduces the current therethrough to a value which inherently renders the SCR nonconducting. It will be appreciated that if the switch 24k is released and the value of overload current is such as to cause a gate signal to again be applied to the SCR 24h that it will again conduct and render the power circuit inactive.

In many instances it has been found that upon utilization of a power controlling device in a circuit that an operator upon noting the failure of the required voltage at the output terminals has had no indication of the reason therefor and thus is apt to be uncertain of the cause thereof. This is obviated in the power control circuit of the present invention by the use of an electrically operated indicator, specifically an incandescent bulb 24L connected between the cathode of the SCR 24h and the lead B, which becomes illuminated upon the SCR 24h conducting. Thus an operator is easily and simply able to determine if the overload current safety circuit prevents the appearance of the output voltage and thus be able to trace the reason for this condition.

The construction of the overload current safety circuit enables it to be easily made more precise in reacting to overload current values than the usual circuit breaker or fuse having common tolerances. Also the use of the adjustable potentiometer 24d with various values of capacitance for the condenser 24c provide a wide range of values at which the circuit 24 will react. Moreover, by incorporating the circuit within the device, the value of current may be adjusted by the manufacturer rather than relying on an installer or the user who may incorrectly set the value and in addition tends to prevent tampering or bypassing of the circuit during use.

It will accordingly be appreciated that there has been disclosed a power control device in which semiconductors are employed to regulate the power between input and output terminals by their being rendered conducting for prescribed intervals of each half cycle of the alternating current regulated by the device. In the event that the current should exceed a desired value by either a relatively small amount over a relatively sustained period or a larger amount over a shorter period, the semiconductors are prevented from being rendered conducting and remain in this condition until either manually reset or the A.C. power input is interrupted. During this condition, there is provided a readily apparent indication to an operator that the condition is present and hence explains the lack of power at the output terminals. The above condition of nonconduction is achieved by the incorporation into the power control device of an overload current safety circuit that is extremely simple in construction but yet which is extremely positive in operation.

Variations and modifications may be made within the scope of the claims and portions of the improvements may be used without others.

I claim:

1. A power control device comprising input terminals connectable to a source of alternating current, output terminals at which output power appears, semiconductor power means connected between the input and output terminals to regulate the power therebetween, said power means being normally nonconducting but rendered conducting upon the receipt of a signal, signal means connected to the power means for providing the signal at a prescribed time during each half cycle of alternating current to provide the desired power output, said signal means including a condenser that at a predetermined voltage effects the providing of a signal and an overload current safety circuit means for preventing a signal to the power means, said circuit means including current sensing means for sensing the current to the output terminals, and means actuated by a predetermined amount of current above a desired amount and connected to the signal means and the condenser for preventing the signal means from supplying a signal to the power means by preventing the condenser from obtaining the predetermined voltage.

2. The invention as defined in claim 1 in which the signal means includes a precharge circuit for providing a precharge voltage on the condenser and a power supply circuit for supplying a voltage to the precharge circuit, said circuit means being connected to the power supply circuit and operable upon actuation to decrease the voltage of the power supply circuit.

3. The invention as defined is claim 1 in which the signal means includes a charging circuit for increasing the voltage on the condenser and a power supply circuit for supplying a voltage to the charging circuit, said circuit means being connected to the power supply circuit and operable upon actuation to decrease the voltage of the power supply circuit.

4. The invention as defined in claim 1 in which the signal means includes a firing circuit that is rendered oscillating upon the condenser achieving a predetermined voltage, with the oscillations of the firing circuit being the signal from the signal means, and a power supply circuit for supplying a voltage to the charging circuit, said circuit means being connected to the power supply circuit and operable upon actuation to decrease the voltage of the power supply circuit.

5. A power control device comprising input terminals connectable to a source of alternating current, output terminals at which output power appears, semiconductor power means connected between the input and output terminals to regulate the power therebetween, said power means being normally nonconducting but rendered conducting upon the receipt of a signal, signal means connected to the power means for providing the signal at a prescribed time during each half cycle of alternating current to provide the desired power output, said signal means including settable means for providing an adjustable voltage whose value is related to the prescribed time when the signal means supplies the signal and having at least one value which is insufficient to cause said signal means to produce a signal and an overload current safety circuit means for preventing a signal to the power means, said circuit means including current sensing means for sensing the current to the output terminals, means actuated by a predetermined amount of current above a desired amount and connected to the signal means for preventing the signal means from supplying a signal to the power means, said means for preventing the signal includes means for causing said settable means to provide an insufficient voltage to the signal means and for maintaining said insufficient voltage and manually operable means for ceasing actuation of the last-named preventing means.

6. The invention as defined in claim 5 in which there is provided indicating means connected to the circuit means and being energized upon actuation of the circuit means to provide an indication of the actuation of the circuit means.

7. A power control device comprising input terminals connectable to a source of alternating current, output terminals at which output power appears, semiconductor power means connected between the input and output terminals to regulate the power therebetween, said power means being normally nonconducting but rendered conducting upon the receipt of a signal, signal means connected to the power means for providing the signal at a prescribed time during each half cycle of alternating current to provide the desired power output, a power supply circuit for providing a voltage to the signal means for enabling operation thereof above a preselected value, and an overload current safety circuit means for preventing a signal to the power means, said circuit means including current sensing means for sensing the current to the output terminals and providing a direct current signal related in value to the current, and means actuated by a predetermined amount of current above a desired amount and connected to the signal means for preventing the signal means from supplying a signal to the power means, said last-named means including a semiconductor element having a triggering element and being normally nonconducting but being conducting upon application of a trigger signal to the triggering element, a resistance capacitance network connected to receive the direct current signal and a reversely connected breakdown diode connected between the triggering element and the resistance network.

8. The invention as defined in claim 7 in which the resistance-capacitance network includes an adjustable member for adjusting the amount of current which will cause actuation of the circuit means.

References Cited

UNITED STATES PATENTS

| | | | |
|---|---|---|---|
| 3,281,638 | 10/1966 | Crawford | 321—16 |
| 3,260,916 | 7/1966 | Watrous | 321—14 |
| 3,193,725 | 7/1965 | Skirpan | 323—22 |
| 3,189,810 | 6/1965 | MacGregor | 318—227 |
| 3,165,649 | 1/1965 | Ault | 307—88.5 |

JOHN F. COUCH, *Primary Examiner.*

W. H. BEHA, Jr., M. L. WACHTELL,

*Assistant Examiners.*